UNITED STATES PATENT OFFICE.

LEONARD PAGET, OF NEW YORK, N. Y., ASSIGNOR TO THE EGYPTIAN LACQUER MANUFACTURING COMPANY, OF NEW JERSEY.

PROCESS OF MAKING PYROXYLINE COMPOUNDS AND THEIR PRODUCTS.

SPECIFICATION forming part of Letters Patent No. 494,791, dated April 4, 1893.

Application filed February 3, 1893. Serial No. 460,895. (No specimens.)

*To all whom it may concern:*

Be it known that I, LEONARD PAGET, a citizen of the United States, residing in the city, county, and State of New York, have invented certain new and useful Improvements in Processes of Making Pyroxyline Compounds and their Products; and I do hereby declare that the following is a full, clear, and exact description of the invention, which will enable others skilled in the art to which it appertains to make and use the same.

Compounds of pyroxyline are solid, liquid, or of an intermediate state. A solid compound is produced by acting upon soluble pyroxyline with the vapor of camphor. In such a compound, the pyroxyline has suffered what is known as "conversion." By conversion is meant that the pyroxyline has lost all structural and cellular form, and has become a homogeneous mass. A liquid compound may be produced by immersion of the pyroxyline in an active liquid solvent; in such a solution of pyroxyline conversion has first occurred and is implied. That conversion has first occurred can be shown by the experiment of treating the pyroxyline with a minimum amount of the active liquid solvent; then evaporation of the excess of solvent, if any, leaves a converted mass that by no known chemical treatment can be brought to the stage preceding conversion. Conversion and solution have therefore sometimes been used as synonymous terms in relation to liquid solvents. Conversion and solution can be produced by a simple solvent substance, such as wood alcohol, when, generally, the solution can be diluted without limit by addition of the same substance. But there are some substances, as for instance some essential oils that produce conversion of the pyroxyline and throw out their own excess, that is, no more oil is taken up by the pyroxyline than is necessary to the act of conversion, than of solution in the same oil being refused. Conversion and solution can also be produced by a mixture of substances neither of which is by itself a solvent, as with alcohol and ether; and it may occur, as it does in this case, that dilution of the solution may be made without limit by one of the substances and not by the other, the addition of this other producing precipitation of the converted pyroxyline. Consequently, besides conversion and solution, there must be studied the phenomena of dilution, when an attenuated solution of pyroxyline is desired.

When pyroxyline is converted and dissolved in methyl alcohol, the solution can be diluted to any desired extent with anhydrous ethyl alcohol, but not with anhydrous amyl alcohol, because the latter produces precipitation of the converted pyroxyline at an early stage, which the former does not. In fact where in the art a quick-setting gelatinous, plastic compound is requred, a precipitant such as amyl alcohol may be advantageously employed to bring about a solidification and to set free the solvent more quickly. Besides these considerations there are others, especially those relating to degree of volatility, requiring attention when a more or less dilute pyroxyline compound is desired; and this sketch of the state of the art is given in explanation of the object of my invention, which is broadly to extend the list of known solvents and diluents of solvents of pyroxyline. But more specifically the object of my invention is to procure solvents of pyroxyline and diluents of solvents of pyroxyline whose characteristics and properties can be more definitely determined beforehand, or so-to-say, prophetically, than is the case with those hitherto employed in the art. I have discovered such a series of solvents and diluents of solvents of pyroxyline in what are chemically known as the mixed ethers, produced by etherification of mixtures of the primary alcohols under the action of sulphuric acid or its equivalent, by the ordinary process of etherification; and I have found that according to the nature and proportion of the primary alcohols and of the acid taken, so can the resultant mixed ether have certain desired properties not to be obtained by the mixtures of the primary alcohol, but which might be the resultant of the properties of these alcohols taken individually, could such an individual use have been possible.

I have found that a mixed compound ether produced, by the distillation with sulphuric acid and a compounding acid not dissociated by contact with sulphuric acid at the required temperature, from a mixture of primary alcohols not either themselves alone active solvents of pyroxyline, nor becoming an active solvent by their admixture, is generally a powerful solvent of pyroxyline; that is, I have tested this general statement in a considerable number of combinations and have yet to find an exception, selecting the constituent alcohols and compounding acid with the knowledge one skilled in the art of manufacturing pyroxyline compounds would exercise. For instance, etherification of a mixture of ethyl and amyl alcohols by sulphuric acid in presence of acetic acid produces a mixed compound ether, or rather an acetic compound of a mixed ether that is strongly and actively solvent of pyroxyline and is a diluent of its own, and of other, solutions.

By varying the proportions of the constituent primary alcohols, compounds are obtainable having varying volatilities.

To carry my invention into effect, I put into a glass still, say twenty-five parts by weight of ethyl or grain alcohol, and twenty-five to twenty parts by weight of fusel oil or amyl alcohol, with twenty-five parts by weight of sulphuric acid and twelve and one-half parts by weight of acetic acid, arranging for further supplies continuously, as in the ordinary process of etherification, should the process be designed to be continuous. But I do not limit myself to these proportions, as it will be obvious to one skilled in the art that other proportions may give properties equally desirable as those obtained in the compound produced with the preceding proportions. Nor do I limit myself to the use of acetic acid, but I do limit myself to a mixture of primary alcohols, none of the mixture having solvent action on pyroxyline, which mixture is to be subjected to etherification with a compounding acid in presence of sulphuric acid. It is generally requisite that these ethers be rectified.

I am aware that mixtures of acetate of amyl and acetate of ethyl have solvent action on pyroxyline and as such are old in the art, but the compounds I obtain by my process are not such mixtures, nor have the boiling points nor characteristics of such mixtures.

Having fully described my invention, what I claim, and desire to secure by Letters Patent, is—

1. A process of making a solvent pyroxyline which consists in making together alcohols which are not solvents of pyroxyline, adding to such mixture sulphuric and acetic acids, and distilling.

2. A process of making a solvent of pyroxyline which consists in mixing together alcohols which are not solvents of pyroxyline, adding to such mixtures sulphuric acid and an acid that will combine with the mixed ether or ethers produced in the process of distillation, and distilling.

3. A pyroxyline solution composed of pyroxyline and a mixed compound ether obtained by the etherification of a mixture of alcohols none of which is of itself solvent of pyroxyline.

LEONARD PAGET.

Witnesses:
E. L. PAGET,
E. D. GRANT.